Feb. 17, 1953     V. G. WALSH     2,628,722
DISPLAY DEVICE

Filed May 24, 1949     5 Sheets-Sheet 1

INVENTOR.
VERN G. WALSH,
BY
McMorrow, Berman + Davidson
ATTORNEYS.

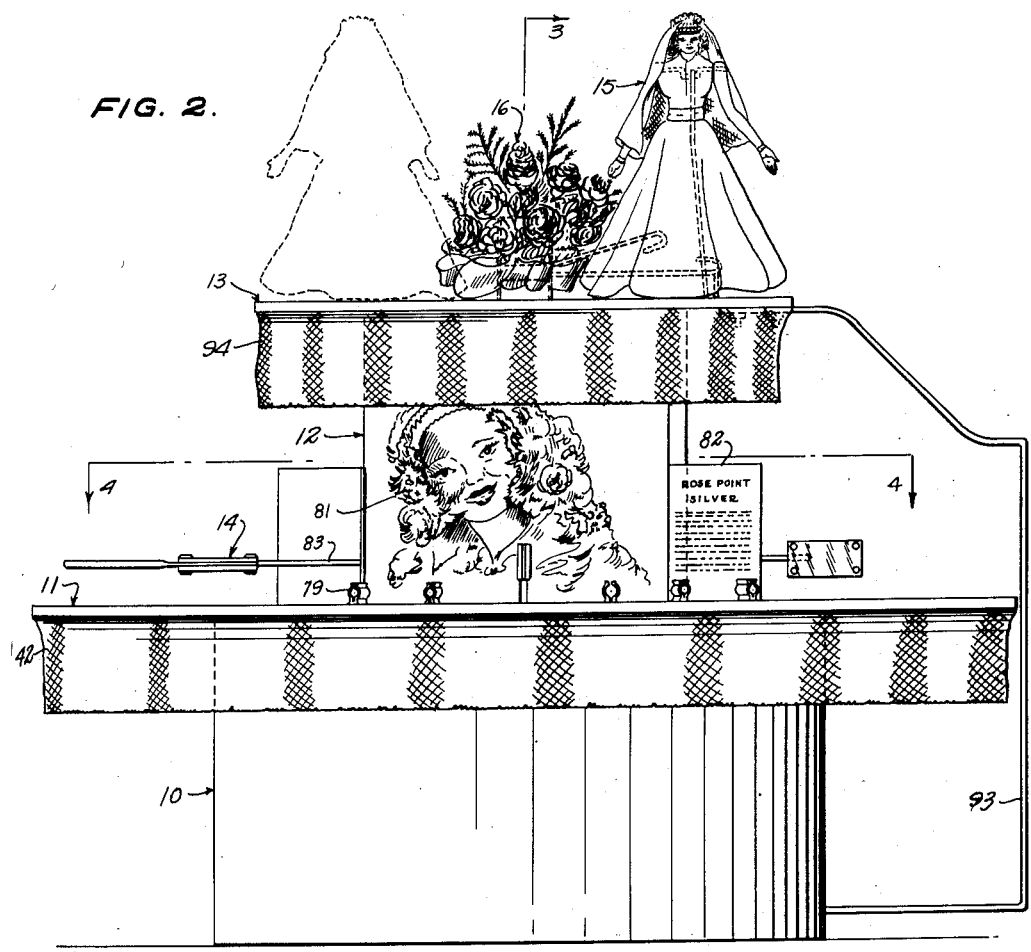

Feb. 17, 1953 V. G. WALSH 2,628,722
DISPLAY DEVICE
Filed May 24, 1949 5 Sheets-Sheet 3

INVENTOR.
VERN G. WALSH,
BY
McMorrow, Berman + Davidson
ATTORNEYS.

Feb. 17, 1953  V. G. WALSH  2,628,722
DISPLAY DEVICE

Filed May 24, 1949  5 Sheets-Sheet 4

INVENTOR.
VERN G. WALSH,
BY
McMorrow, Berman + Davidson
ATTORNEYS

Feb. 17, 1953 V. G. WALSH 2,628,722
DISPLAY DEVICE
Filed May 24, 1949 5 Sheets-Sheet 5
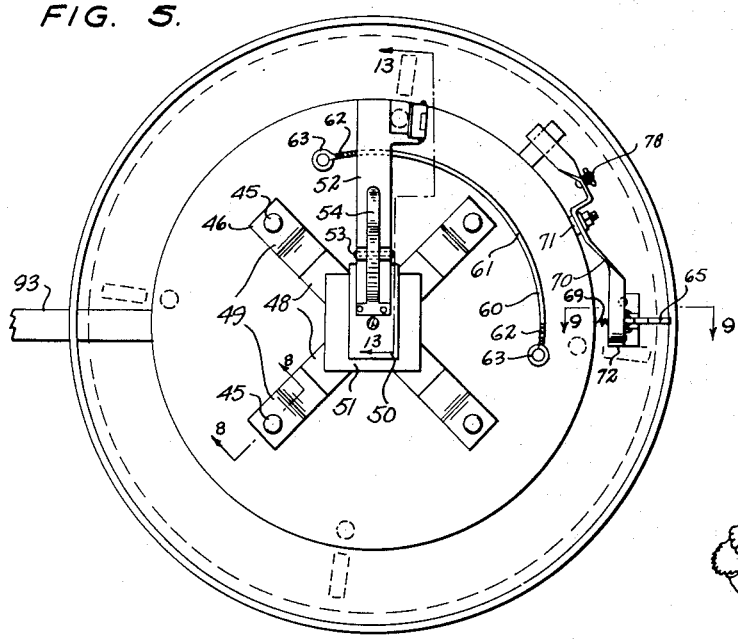
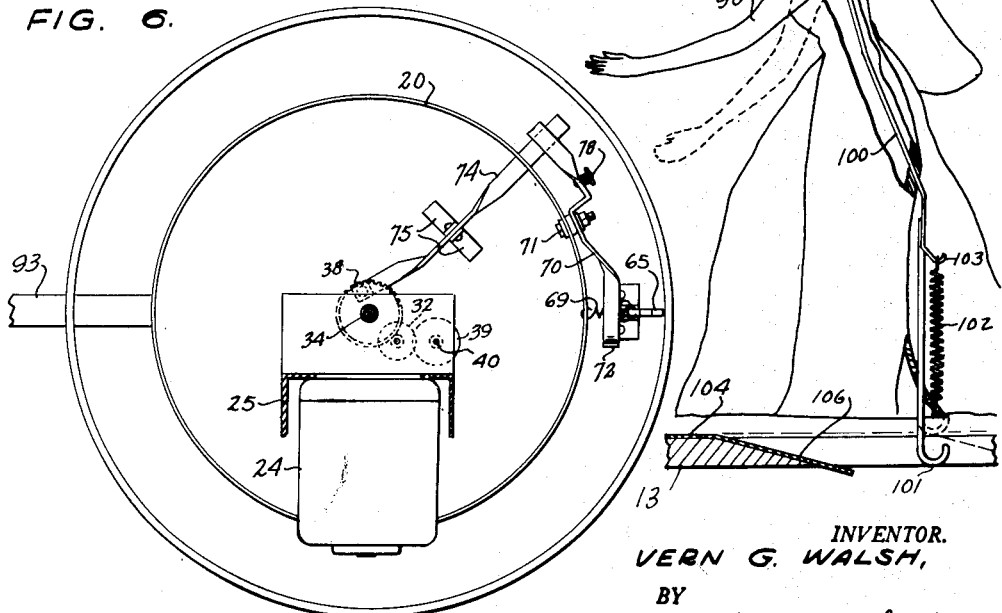
INVENTOR.
VERN G. WALSH,
BY
McMorrow, Berman & Davidson
ATTORNEYS.

Patented Feb. 17, 1953

2,628,722

UNITED STATES PATENT OFFICE 2,628,722

DISPLAY DEVICE

Vern G. Walsh, Fredericksburg, Va.

Application May 24, 1949, Serial No. 95,006

4 Claims. (Cl. 211—1.6)

This invention relates to display devices, and more particularly to a display device to be positioned in a show window to display articles, such as a set of table silverware.

It is among the objects of the invention to provide an improved display device which will support a large number of articles in display positions, will impart movement to all of the articles as a group to successively bring the articles opposite viewing positions, and will impart separate and special movements to selected articles, which will visually direct attention to the group of articles and to selected articles of the group and will suggest, to an observer, an association of the articles with special events, such as associating table silverware with weddings, which may carry ornamentation and advertising matter in addition to the articles on display, and will impart to such ornamentations, advertising matter and articles, periodic or variable movement of a character particularly effective to attract the attention of a person passing by the display, and which is quiet and smooth in operation, extremely attractive in appearance, economical to manufacture and operate, substantially fireproof, and strong and durable in construction.

A somewhat more specific object resides in the provision of a display device simulating a wedding cake and having variously movable parts for displaying sets of table silverware.

Other objects and advantages will become apparent from a consideration of the following description and the appended claims in conjunction with the accompanying drawings, wherein:

Figure 2 is a side elevation of the display device illustrated in Figure 1;

Figure 5 is a transverse cross-section on the line 5—5 of Figure 3;

Figure 6 is a transverse cross-section on the line 6—6 of Figure 3;

Figure 7 is a side elevation of a top ornament of the device, a portion being broken away and shown in cross-section to better illustrate the construction thereof;

Figure 11 is a side elevation of one of the special article holders of the device;

Figure 12 is a top plan view of the article holder illustrated in Figure 11;

Figure 1:
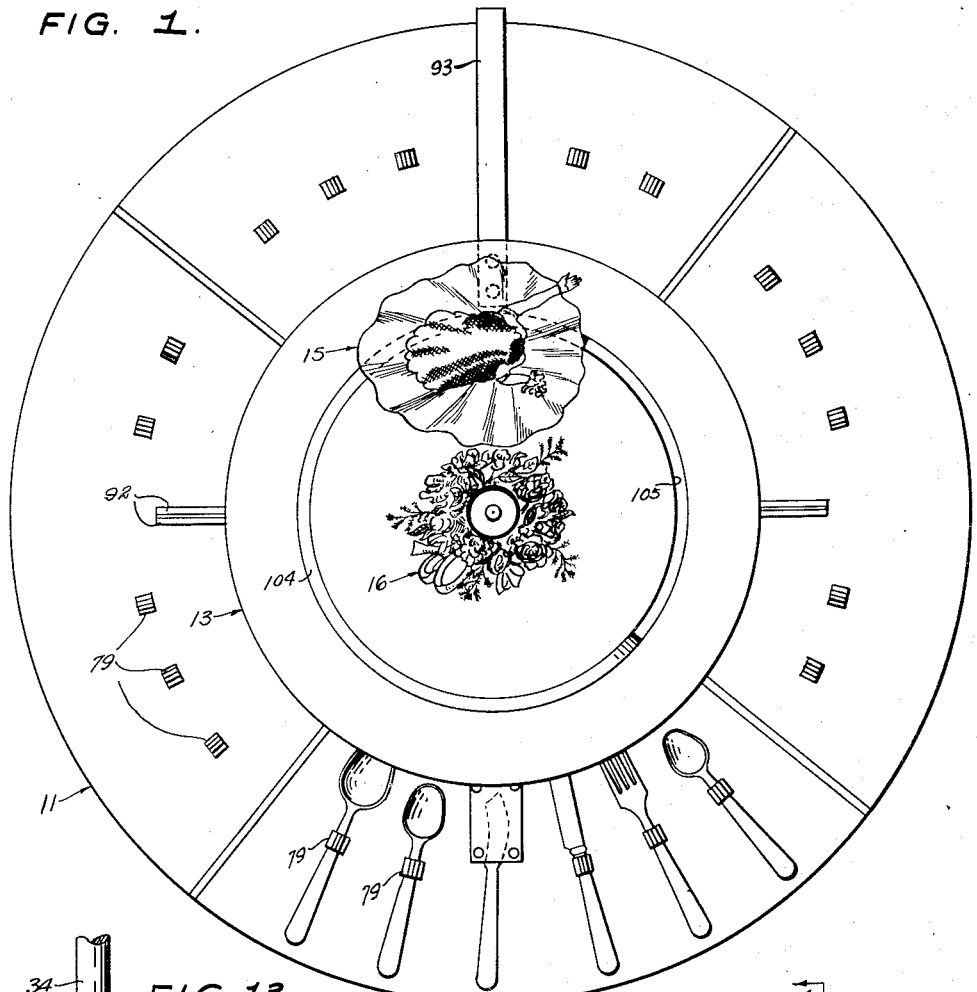
Figure 1 is a top plan view of a display device illustrative of the invention.

With continued reference to the drawings, the device comprises, in general, a fixed base structure 10, a rotatably movable table 11 at the top of the base structure, a superstructure 12 supported on the table 11, a fixed top plate 13, special article carriers 14 projecting laterally from the superstructure above the table 11, and movable ornaments 15 and 16.

The base structure 10 includes a circular, disc-shaped base plate 17, and a cylindrical wall 18 surrounding the base plate 17 and secured at its bottom edge to the periphery of the base plate. A hollow, cylindrical housing 19 is concentrically mounted in the base structure 10 and supported on the base plate 17. This housing has a cylindrical wall 20 provided with screened ventilating openings 21, and top and bottom end walls 22 and 23 respectively.

A small electric motor 24 is mounted in the cylindrical wall 20 of the housing 19 in a manner such that one end protrudes exteriorly of the housing, and the other end is disposed adjacent the center of the housing. A U-shaped bracket 25 is secured to the under side of the top wall 22 of the housing and depends at the inner end of the motor 24 and is provided with a bearing boss 26 in which the motor shaft 27 is journaled. A lay shaft 29 is journaled at its opposite ends in the upper and lower legs 30 and 31 respectively of the U-shaped bracket 25 and carries a worm gear 32 intermediate its length, which worm gear meshes with a worm 33 on the motor shaft. A main drive shaft 34 is journaled at its lower end in the bottom leg 31 of the U-shaped bracket and intermediate its length in a bearing 35 carried by the upper leg 30 of the bracket and projects upwardly from the base structure 10 through the center of the table 11 and through the superstructure 12 and the top plate 13. Intermeshing spur gears 37 and 38 are secured on the shafts 29 and 34 respectively, the gear 37 on shaft 29 being smaller than the gear 38 on shaft 34 to provide a reduced speed drive from the shaft 29 to the shaft 34. This reduced speed drive, together with the speed reduction of the worm gear 32 and worm 33 provides a slow rotation of the drive shaft 34 compared to the rotational speed of the motor shaft 27.

A wiping roller 39 of absorbent material is mounted on a shaft 40 substantially parallel to the shafts 29 and 34 and bears against the worm gear 32 to remove excessive lubricant from the worm gear and redistribute the lubricant around the worm gear, so that the worm drive will be adequately lubricated at all times, and the lubricant will not be thrown off into the housing 19 by rotation of the worm 33.

The table 11 is a flat, circular or annular plate having a central opening 41 through which the shaft 34 extends, and is provided with an outer covering 42 of a suitable fabric which is preferably white, and may be decorated with crystals or other material to simulate cake frosting.

A circular bearing plate 43 is secured to the under surface of the table 11 concentrically of the latter, and is provided with a central opening 44 for the shaft 34. The table 11 is supported on the housing 19 of the base structure by a plurality of suitable anti-friction bearing elements. In the arrangement illustrated, these bearing elements comprise four balls 45 disposed between the under surface of the bearing plate 43 and the top surface of the top end wall 22 of the housing 19. These balls are mounted in a four-armed cage 46 which comprises a center or hub portion 47 centrally apertured to receive the shaft 34 and rigidly secured to the shaft by suitable means, such as welding or soldering, four arms 48 projecting outwardly from the hub portion 47 and provided near their outer ends with respective apertures which receive the lower portions of the corresponding balls 45. A tongue 49 is connected to each arm 48, near the outer end of the latter, and is bent to provide a portion spaced above the corresponding arm, which portion is provided with an aperture receiving the upper portion of the ball 45. The balls 45 are thus maintained spaced apart at substantially equal angular intervals of 90-degrees by the cage 46, and are positioned outwardly from the shaft 34 to provide a stable, tilt-resisting support for the table.

A drive plate 50 is mounted on the shaft 34 above the plate 47 and spaced from the latter by a spacing plate 51. This drive plate is secured to the shaft by suitable means, such as soldering or welding the plate to the shaft around the shaft-receiving aperture in the plate, and is extended at one side to provide the inner part of a hinged arm 52 which projects radially of the shaft 34 from the drive plate 50 beneath the bearing plate 43. The hinge 53 in the arm 52 is so arranged that the outer or distal end of the arm can move up and down, and a leaf spring 54 connected at one end to the drive plate 50 bears on the arm 52 outwardly of the hinge 53 to resiliently force the outer end of the drive arm 52 downwardly.

Figure 13:
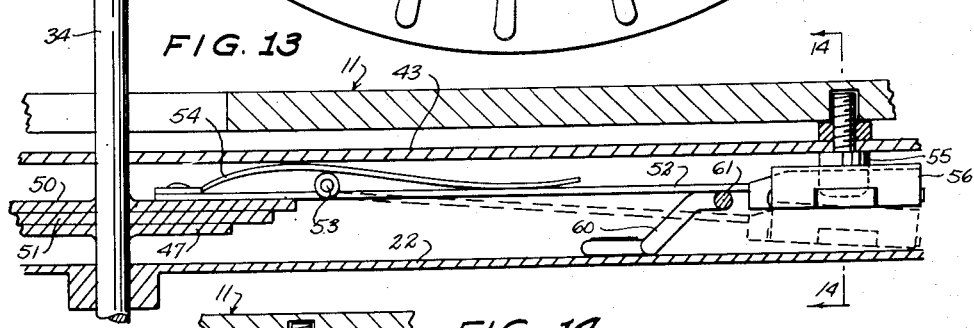
Figure 13 is a longitudinal cross-section of a fragmentary portion of the device taken on the line 13—13 of Figure 5 to show certain structural details.
Figure 14:
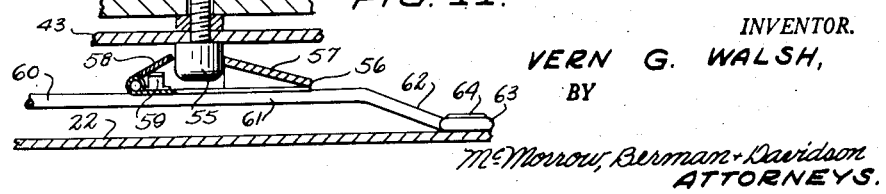
Figure 14 is a longitudinal cross-section on the line 14—14 of Figure 13.
Figure 3:
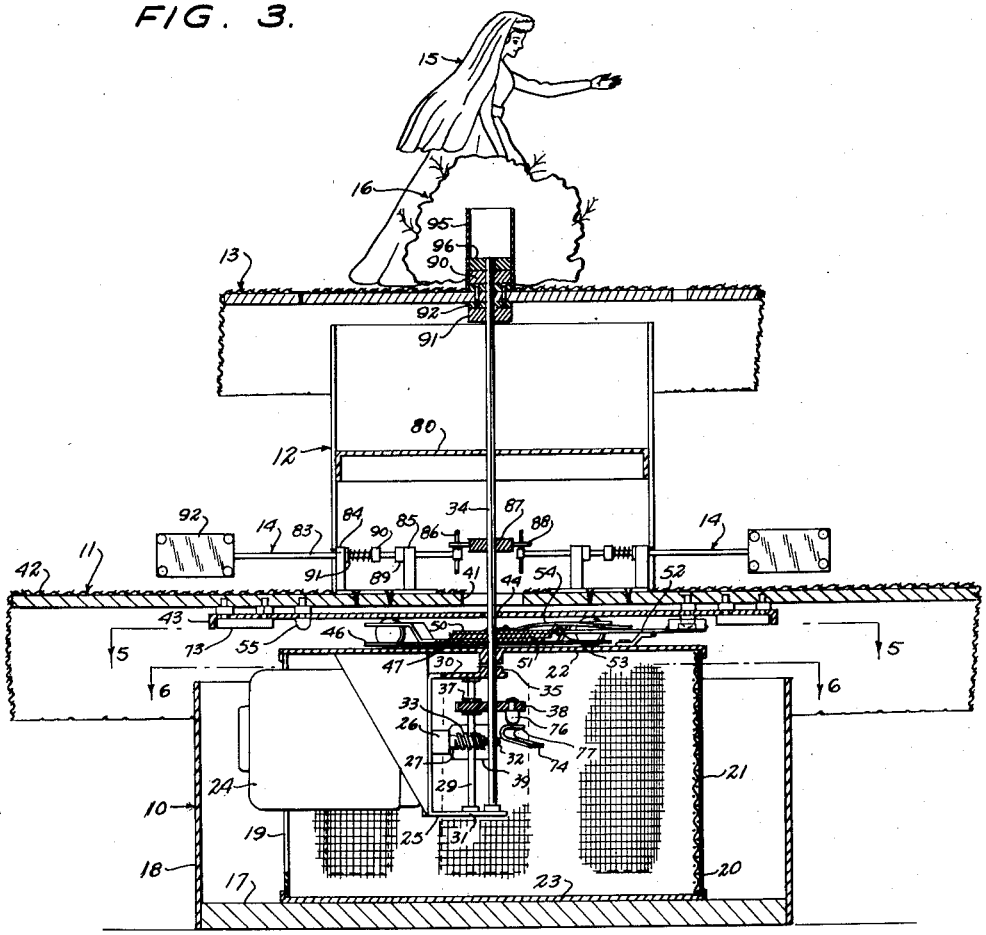
Figure 3 is a longitudinal, medial cross-section taken substantially on the line 3—3 of Figure 2.
Figure 8:
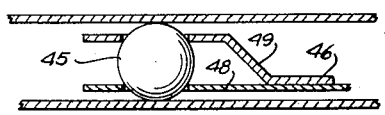
Figure 8 is a transverse cross-section on an enlarged scale of a fragmentary portion of the device taken on the line 8—8 of Figure 5 and showing a structural detail.
Figure 4:
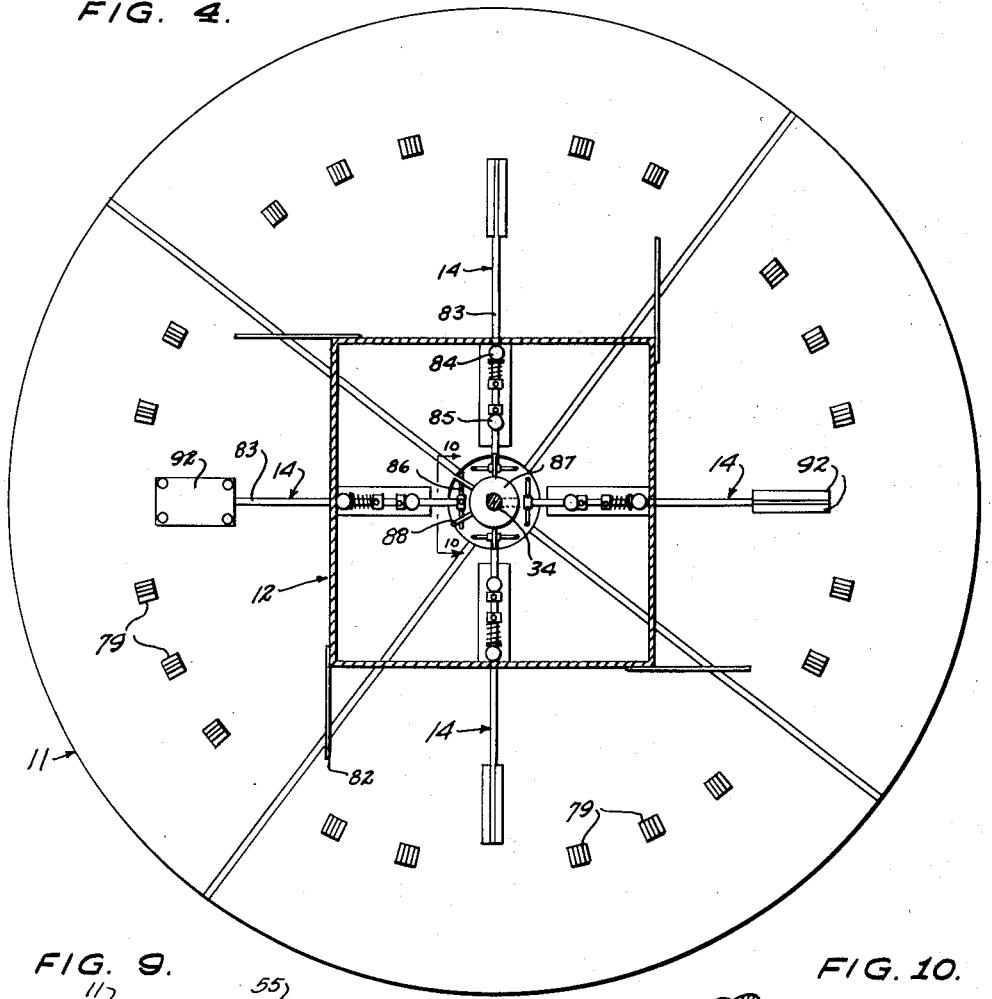
Figure 4 is a transverse cross-section on the line 4—4 of Figure 2.

Four lugs 55 are secured to the bearing plate 43 at substantially equal angular intervals of 90-degrees, and a socket 56, as is particularly illustrated in Figures 13 and 14, is secured on the outer end of the arm 52 to cooperate with the lugs 55 to impart periodic rotational movements to the table 11.

The socket 56 has an inclined wall 57 at the driving side of the arm, and has, at the opposite side of the arm, an inclined, hinged plate 58 resiliently held in an upwardly-inclined position by a light, leaf spring 59. An elongated cam 60 is mounted on the top wall 22 of the housing 19 and may conveniently comprise a length of wire having an arcuately-curved, intermediate portion 61 and downwardly-inclined end portions 62 at its opposite ends terminating in respective eyes 63 which receive screws or rivets 64, by means of which the cam is secured to the top plate 22 of the housing in the path of the outer end of the arm 52 as the arm is rotated over the top end wall of the housing by the shaft 34.

When the outer end of the arm contacts the cam 60, it is raised and the hinged plate 58 will come into contact with the adjacent side of a lug 55 positioned above the cam. The pressure exerted by the arm on the lug will force this plate downwardly against the force of spring 59, permitting the lug to pass over the plate 58 and come into contact with the upper, inner edge of the inclined wall 57 of the socket, at which position of the lug the spring 59 will return the plate 58 to its upwardly-inclined position as the space between the adjacent edges of the plates 57 and 58 is sufficient to receive the lug. With the lug thus held between the plates 57 and 58, the arm 52 will rotate the table 11 until the outer end of the arm passes off of the cam 60, whereupon the spring 54 will force the outer end of the arm downwardly, disengaging the socket 56 from the lug and discontinuing the drive to the table 11 until the arm has completed a portion of its rotation sufficient to bring it again into contact with the cam 60. The parts are preferably so spaced and proportioned that the table will rotate approximately one-quarter of a revolution for each complete revolution of the shaft 34.

Figure 9:
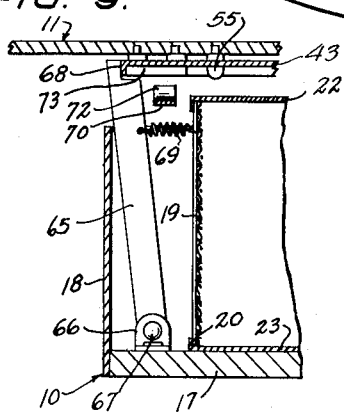
Figure 9 is a longitudinal cross-section of a fragmentary portion of the device taken on the line 9—9 of Figure 5 and showing a structural detail.
Figure 10:
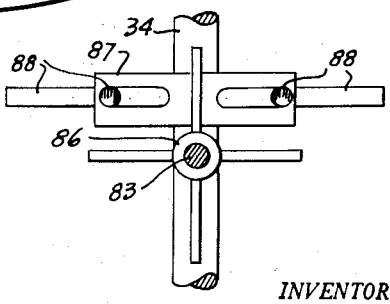
Figure 10 is a transverse cross-section on an enlarged scale of a fragmentary portion of the device taken on the line 10—10 of Figure 4 and showing a structural detail.

A friction brake is provided for the table 11, as particularly illustrtaed in Figure 9, and comprises a lever 65 pivotaly connected at its lower end to the base plate 17 by a pair of apertured ears 66 extending upwardly in spaced-apart relationship from the base plate and receiving a pivot pin 67 which extends through respective apertures in the ears and through an aperture in the lever 65 near the lower end of the latter. At its upper end the lever is provided with a notch receiving the edge of the bearing plate 43 and the lever, at one side of the notch, frictionally bears against the peripheral flange 68 of the bearing plate, being held in contact with the bearing plate by a tension spring 69 connected between the lever and the wall 20 of the housing 19.

Positive stop means for the movements of the table are also provided, as illustrated in Figures 3, 5, 6 and 9. This means comprises a lever 70 pivotally mounted, intermediate its length, on the wall 20 of the housing 19 by a pivot bolt or screw 71, and having at one end an upturned hook 72 which is engageable with any one of a plurality of elongated stops 73 secured to the under side of the bearing plate 43 respectively in registry with the lugs 55 and disposed outwardly of the latter, a second lever 74 pivotally mounted, intermediate its length, on the top end wall 22 of the housing 19 by a pair of spaced-apart, apertured ears 75 and extending under the large spur gear 38 mounted on the shaft 34, and a projection 76 mounted on the gear and depending therefrom. The end of the lever 74, disposed below the gear 38, is provided with a rounded hook 77 engageable by the projection 76 once during each rotation of the gear 38. A tension spring 78 is connected between the lever 70 and the base plate 17, the connection of the spring with the lever being at the side of the pivot pin 71 opposite the hook 72, so that the hook will be resiliently urged upwardly to engage the stops 73. The outer end of lever 74 is disposed below the end of lever 70 opposite the hook 72, so that when the inner end of lever 74 is depressed by the projection 76 passing over the hook 77, the hook 72 on lever 70 will be lowered to release the stop 73, permitting rotational movement of the table 11 to resume.

With this construction, when the motor 24 is energized, the table 11 will move through one-quarter of a revolution and will then be positively held stationary while the shaft 34 completes the remaining three-quarters of the revolution, whereupon the table will be released and will move through a subsequent one-quarter of a revolution and again be positively held stationary while the shaft 34 again completes the remaining three-quarters of the revolution. The rotational movements of the table will thus be quarter revolutions, spaced apart by time intervals, three times as long as the interval during which the table is in motion. While the table is in motion it is held against vibration by the friction drag of the lever 65.

Angularly spaced-apart clips 79 are secured on the upper surface of the table and are preferably arranged on a circle somewhat smaller than the outer circumference of the circular table, these clips being provided to display articles, such as pieces of table silverware on the top of the table.

The superstructure 12 is a thin-walled, hollow body extending upwardly above the top of the table 11 concentric with the shaft 34 and may be either rectangular, polygonal or circular in shape, as may be desired. In the illustration the superstructure is made rectangular for convenience in applying advertising matter thereto.

A transverse partition 80 extends across the superstructure 12 substantially at the mid-height location of the superstructure, and is provided with a central opening for the shaft 34.

The advertising matter carried by the superstructure may take the form of pictures or other displays, as indicated at 81 in Figure 2, mounted on the sides of the superstructure, and tabs 82 projecting outwardly of the sides of the superstructure respectively, carrying printed matter, charts or price lists, as may be desired.

There are preferably four of the arms 14 spaced at substantially equal angular intervals of 90-degrees around the shaft 34 and extending through corresponding sides of the superstructure 12 substantially at the mid-width locations of such sides and at a level above the top of the table 11 sufficient only to provide adequate clearance for rotation of the arms and articles held thereby without interference between the arms and article holders and the articles with the table.

Each of the devices 14 comprises an elongated shaft 83 journaled in a pair of spaced-apart standards 84 and 85 upstanding from the top of the table at the inner side of the corresponding side wall of the superstructure 12, the shaft 83 being spaced above and substantially parallel to the top of the table 11. A four-pointed star wheel 86 is mounted on the inner end of the shaft 83 adjacent the shaft 34 and a disc 87 is mounted on the shaft 34 and provided with radially, outwardly-extending pins 88 which are engageable with the spokes or points of the star wheel 87 to rotate the latter. The shaft 83 is maintained against longitudinal movement in an inward direction by a collar 89 secured on the shaft and bearing against the inner standard 85, and is resiliently held against longitudinal, outward movement by a collar 90 secured on the shaft, and a compression spring 91 surrounding the shaft between the collar 90 and the outer standard 84. With this arrangement, if there is any interference between the pins 88 and the spokes of the star wheels 86, the mechanism will not be fouled, since the shafts 83 may move outward sufficiently to overcome such interference.

A pair of side-by-side plates 92 is secured to the outer end of the shaft 83 and project outwardly therefrom, these plates being adjustably secured together so that a portion of a display article, such as the blade of a piece of table silverware, may be clamped therebetween to extend outwardly from these plates above the top of the table 11.

With this arrangement, the devices 14 will rotate with the table and the superstructure 12 during the rotational movements of these components, but will not rotate about the axes of the corresponding shafts 83 at such times. However, when the table 11 is held against rotation, and the shaft 34 is completing the portion of its rotation during which the table is held stationary, the shafts 83 will be rotated by the drive connection including the star wheels 86, the disc 87 and the pins 88, such motion being somewhat periodic or erratic by reason of the construction of the drive mechanism.

Thus, portions of the display device will be in movement at all times, the devices 14 being rotated during the times the table 11 and superstructure 12 are held stationary.

Near its upper end, the shaft 34 extends through a central aperture in the circular top plate 13 and carries upper and lower thrust bearings 90 and 91 respectively, disposed at the upper and lower sides of the top plate. A bearing structure 92 is carried by the top plate between the thrust bearings 90 and 91, so that the shaft can rotate in the top plate while supporting the weight of the latter.

A curved metal strap 93 extends from the base plate 17 to the top plate 13 and is secured at one end to the base plate, and at its opposite end to the top plate to hold the top plate against rotation relative to the base plate.

The top plate 13 is covered with a suitable fabric covering 94 which is preferably white, and may, if desired, be decorated with crystals or other substance to simulate cake icing.

A tubular sleeve 95 is telescoped upon the upper thrust bearing 90, and a washer 96 secured to the shaft 34 above the thrust bearing 90, and is rotatable with the shaft 34. This sleeve is covered by the ornament 16 which may be made to simulate a bridal bouquet of suitable flowers. An arm 97 projects radially outwardly from the sleeve and into the body of the ornament 16 which may be a doll in a simulated bridal costume. This arm 97 will carry the ornament 16 around the top plate 13 as the shaft 34 rotates.

As particularly illustrated in Figure 7, one arm 98 of the doll is pivotally connected to the doll body at the shoulder end of the arm, and a short crank 99 extends rearwardly from the arm 98 at the shoulder end of the latter. A link 100 is pivotally connected at its upper end to the outer end of the crank 99 and extends downwardly through the hollow body of the doll, and is provided, on its lower end, with a rounded hook 101. A tension spring 102 connected between a tongue 103 on the link 100 and the body of the ornament 16, at the lower end of the body, resiliently urges the link 100 downwardly, and the doll arm 98 upwardly to the position shown in full lines in Figure 7.

The top plate 13 is provided with a circular track 104, particularly illustrated in Figure 1, and one part of this track is cut away to provide a slot 105 having inclined ends, as indicated at 106 in Figure 7. The hook 101 of the link 100 rides upon the track 104, and when this hook reaches the slotted portion of the track, the link 100 descends, raising the doll arm 98. When the hook 101 comes to the inclined end 106 of the slot, the doll arm 98 is lowered with a pointing motion toward the display articles carried on and above the table 11.

The various components carried by the shaft 34 are detachably connected to the shaft, so that the entire device can be quickly assembled and disassembled, and the entire device, while of extremely light weight, is strong and durable because of the hollow construction of its various parts.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A display device comprising a hollow base structure, an electric motor mounted in said base structure, a main shaft journaled in said base structure and projecting upwardly from the latter, a driving connection between said motor and said main shaft, a table disposed above said base structure and having a central aperture receiving said main shaft, antifriction means supporting said table on said base structure for rotational movement of said table, means providing an intermittent drive connection between said main shaft and said table, latch means acting between said base structure and said table releasably holding said table against movement, latch operating means rotatable with said main shaft releasing said latch means at periodic intervals to free said table for intermittent rotational movements, shafts journaled on said table for rotational movement about their individual axes and extending outwardly from said main shaft, and means on said main shaft periodically driving said shafts during the intervals in which said table is releasably held by said latch means.

2. A display device comprising a fixed base structure, a flat table rotatably supported on the top of said base structure for rotational movements about its center, shafts rotatably mounted on said table and disposed above the latter at angularly spaced apart locations thereround, article holders mounted one on each of said shafts, a motor mounted in said base structure, drive means connecting said motor to said table and imparting intermittent rotational movements to said table and said shafts about an axis substantially perpendicular to said table, and drive means connecting said motor to said shafts and imparting intermittent rotational movements to the latter about their longitudinal center lines as axes during the intervals between the intermittent rotational movements of said table.

3. A display device comprising a hollow base structure, an electric motor mounted in said base structure, a main shaft journaled in said base structure and projecting upwardly from the latter, a driving connection between said motor and said main shaft, a table at the top of said base structure, antifriction means between said table and said base structure supporting the former on the latter for relative rotational movements, an intermittent driving connection between said main shaft and said table imparting intermittent rotational movements to the latter, shafts journaled on said table and disposed at angularly spaced part locations around said table and above the same, article holders mounted one on each of said shafts, and a driving connection between each shaft and said main shaft imparting intermittent rotational movements to said shafts about their longitudinal center lines as axes when said main shaft rotates relative to said table incident to the intermittent rotation of the table.

4. In a display device including a hollow base structure, a main shaft journaled in said base structure, a table mounted above said base structure substantially perpendicular to said main shaft and rotatable relative to said base structure independently of said main shaft, and a motor drivingly connected to said main shaft, means providing an intermittent drive connection between said main shaft and said table and an intermittently released stop connection between said base structure and said table comprising projections on the under side of said table at substantially equal angular intervals thereround, an arm secured at one end to said main shaft and disposed between said base structure and said table, a socket on the other end of said arm, means on said base structure moving said socket into engagement with table carried projections successively in a manner such that said socket is in engagement with a projection during a predetermined angular interval of each rotation of said main shaft and is released from such projection when said table has been turned through said predetermined angular interval, a latch lever pivotally mounted on said base structure, means resiliently urging said latch lever into engagement with table carried projections to hold said table against rotational movement, and means disposed between said main shaft and said latch lever and operated by said main shaft to release said latch lever from the projection with it is engaged each time said socket is brought into engagement with a projection on said table.

VERN G. WALSH.

REFERENCES CITED

The following references are of record in the file of this patent:

UNITED STATES PATENTS

| Number | Name | Date |
|---|---|---|
| 406,163 | Faries | July 2, 1889 |
| 622,316 | Xander | Apr. 4, 1899 |
| 795,837 | Hyde et al. | Aug. 1, 1905 |
| 887,715 | Xander | May 12, 1908 |
| 1,780,194 | Kende | Nov. 4, 1930 |
| 2,017,420 | Paulero et al. | Oct. 15, 1935 |
| 2,306,938 | Ebbert | Dec. 29, 1942 |